United States Patent [19]
Johnstun

[11] 3,940,609
[45] Feb. 24, 1976

[54] ANGULAR POSITION MEASURING APPARATUS

[76] Inventor: Dick E. Johnstun, 1355 E. Granada Drive, Sandy, Utah 84070

[22] Filed: Oct. 9, 1974

[21] Appl. No.: 513,218

[52] U.S. Cl............ 250/231 SE; 250/236; 250/578; 350/6; 350/285
[51] Int. Cl.² .......................................... G01D 5/34
[58] Field of Search .......... 250/231 SE, 231 R, 236, 250/208, 209, 578, 230; 356/152; 350/6, 7, 104, 285, 286

[56] References Cited
UNITED STATES PATENTS

| | | | |
|---|---|---|---|
| 2,168,886 | 8/1939 | Roberts............................ | 250/231 R |
| 2,447,344 | 8/1948 | Kliever.......................... | 250/231 R X |
| 3,475,552 | 10/1969 | Makino et al................... | 250/578 X |
| 3,667,850 | 6/1972 | Smith et al...................... | 250/236 X |

OTHER PUBLICATIONS

*Photoelectric Electric Circuit Breaker*, F. B. Porterfield, IBM Technical Disclosure Bulletin, Vol. 1, No. 4, Dec. 1958, p. 8.

*Primary Examiner*—Archie R. Borchelt
*Assistant Examiner*—E. R. La Roche
*Attorney, Agent, or Firm*—Criddle & Thorpe

[57] ABSTRACT

Angular position measuring apparatus includes a prism mounted on a shaft whose angular position is to be determined, and a light source for directing a beam of light onto the prism. The prism is formed so that the light beam enters one surface of the prism and is refracted by another surface and caused to be directed in different directions as the prism, and thus the shaft, is rotated. Also included is an array of photo detectors positioned so that the refracted light impinges on various ones of the photo detectors depending upon the angular position of the shaft. The photo detector on which the light impinges is thereby caused to generate an electrical signal which is applied to utilization apparatus.

9 Claims, 5 Drawing Figures

ANGULAR POSITION MEASURING APPARATUS

BACKGROUND OF THE INVENTION

This invention relates to apparatus for determining the angular position of a rotatable device, shaft or the like.

There are numerous types of devices for measuring the angular position of a shaft or the like. Such devices sometimes referred to as shaft angle encoders oftentimes utilize a light source or sources, photo detectors, and some kind of "coded" card which moves between the light sources and photo detectors as the shaft whose angle is to be measured is rotated. As the card is moved, various light patterns are detected by the photo detectors to indicate angular position of the shaft.

The coded card is oftentimes formed into a drum and mounted on the shaft to rotate therewith. The light source (or the photo detectors) is positioned inside the drum with the photo detectors (or light source) being positioned outside the drum. Examples of shaft angle encoders which utilize such a drum or cylinder configuration are described in U.S. Pat. Nos. 3,714,448; 3,731,107; 3,742,486 and 3,770,970. One of the drawbacks with this drum-type configuration is the spatial problem of conveniently positioning the necessary components inside and outside of the drum. Such positioning may be quite awkward, especially since the shaft whose angle is to be determined will be associated with some equipment which must be accounted for in locating the shaft angle encoder equipment.

Another arrangement oftentimes used with the coded card is to provide a disc mounted on the shaft whose angle is to be determined, locate or code a plurality of openings in the disc, and position a light source or sources on one side of the disc and photo detectors on the other side. Examples of this type of arrangement are described in U.S. Pat. No. 3,234,394 and 3,381,288. Again, with this type configuration, it is oftentimes difficult to conveniently position the shaft angle encoder equipment so as not to interfere with the equipment associated with the shaft.

SUMMARY OF THE INVENTION

It is an object of the present invention to provide a simple and inexpensive angular position measuring arrangement having few component parts.

It is another object of the present invention to provide such an arrangement in which most of the component parts thereof may be positioned at substantial distances and out of the way of the shaft whose angular position is to be determined.

The above and other objects of the present invention are realized in a specific illustrative embodiment which includes a prism coupled to rotate with a shaft whose angular position is to be determined, a light beam source for detecting a light beam onto the prism to pass therethrough, and an array of photo detectors positioned to intercept the light beam passing through the prism. The prism is formed to refract the beam of light and to direct the light onto different ones of the photo detectors as the prism, and thus the shaft, is rotated. The particular photo detector onto which the beam of light impinges determines the angular position of the shaft.

In another embodiment of the invention, the prism is provided with reflective surfaces to direct the beam of light in directions other than those in which the refracted beam is directed to enable measuring the angular position of the shaft through a greater angular displacement thereof.

BRIEF DESCRIPTION OF THE DRAWING

The above and other objects, features and advantages of the present invention will become apparent from a consideration of the following detailed description presented in connection with the accompanying drawings in which.

DETAILED DESCRIPTION

Figure 1:
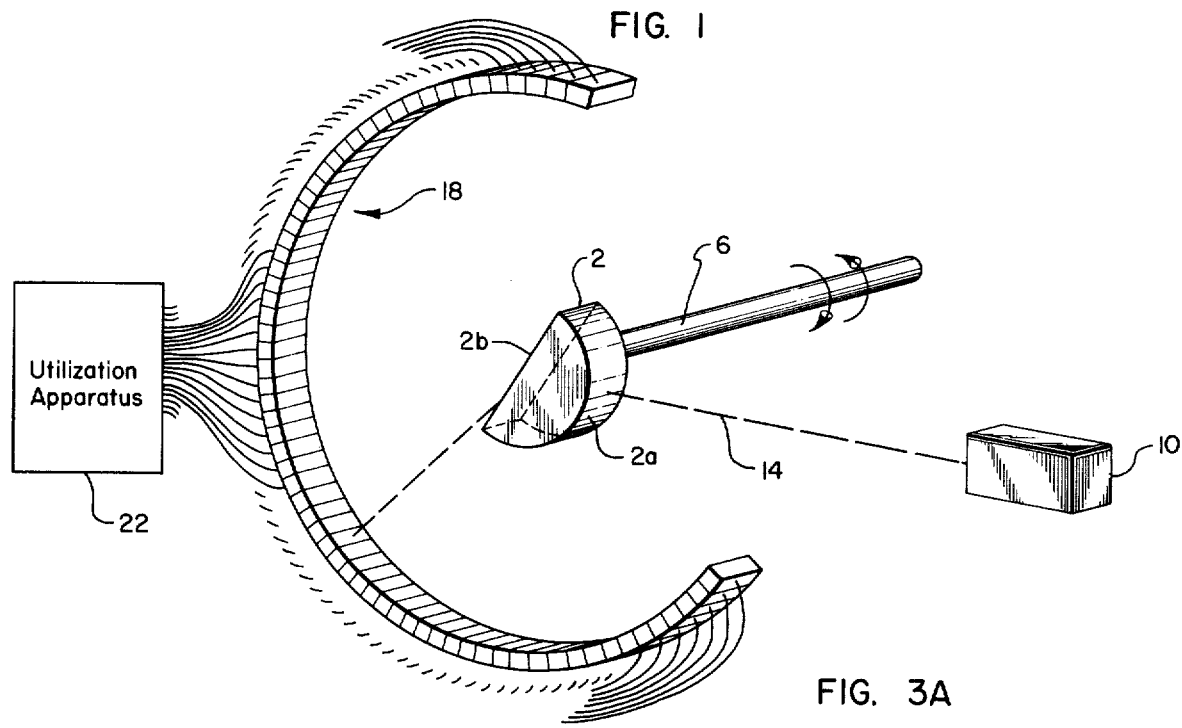
FIG. 1 is a perspective view of angular position measuring apparatus made in accordance with the present invention.

Referring to FIG. 1, there is shown the basic components of one embodiment of the present invention. In this embodiment, a semicylindrical prism 2 is mounted on the end of a shaft 6 whose angular position is to be determined. A light source 10 directs a narrow beam of light 14 onto a curved side 2a of the prism, and this beam passes through the prism and exits from a flat side 2b. The light beam source 10 is maintained in a fixed position relative to the prism 2 and shaft 6 and utilizes well known methods for producing the narrow light beam. This could be done for example using a combination of focusing lenses and a lamp.

A series array of photo detectors 18 is positioned in an arced configuration on the side of the prism 2 opposite the light beam source 10. The photo detector array 18 may consist of any of a variety of photo responsive elements such as photo transistors, photo resistors, etc., which exhibit some electrical parametric change depending upon the presence or absence of a light falling on the element. A photo transistor, for example, is a light sensitive solid state device which either allows passage of current or prevents passage of current therethrough when exposed to light. When the light beam passing through the prism 2 falls on a particular one of the photo detectors in the array 18, that photo detector applies an electrical signal to utilization apparatus 22.

Figure 2:
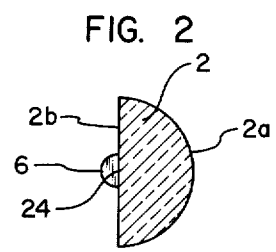
FIG. 2 is an end view of the shaft and prism of FIG. 1.

The prism 2 is mounted on the shaft 6, as generally shown in FIG. 2, so that as the shaft 6 is rotated, the light beam 14 will enter the prism normal to the curved surface 2a. This can be done by mounting the prism 2 to rotate about the center of curvature 24 of the curved side 2a. With the beam 14 entering the prism 2 normal to the surface 2a, no refraction of the beam at that surface takes place. The beam of light 14 passes through the prism 2 and exits from the flat side 2b of the prism and is there refracted to impinge on one of the photo detectors of the array 18. As the shaft 6, and thus prism 2, are rotated, the direction of the refracted beam is caused to move to impinge on successive ones of the photo detectors of the array 18. In particular, as the prism 2 is rotated in the counterclockwise direction, the refracted beam moves in the clockwise direction along the array 18 and as the prism 2 is caused to move in a clockwise direction, the refracted beam is caused to move in a counterclockwise direction.

The particular angle at which the refracted beams exits from the flat surface 2b of the prism can be determined by the well known Snell's Law. Since the exit angle of the refracted beam can be determined as a function of the angular position of the prism 2, the particular photo detector of the array 18 on which the refracted beam falls determines the angular position of the shaft 6. The signal applied by the particular photo detector to the utilization apparatus 22 thus indicates to the utilization apparatus the angular position of the shaft 6.

The utilization apparatus 22 might illustratively use the information supplied from the photo detector array 18 to provide some type of visual readout specifying the angular position of the shaft or to perform some computation in which the angular position of the shaft is of importance, etc.

It will be noted that with the FIGS. 1 and 2 structure, the angular position of the shaft 6 may be determined as the shaft rotates through some predetermined angular displacement *less than* 180°. The range of angular positions of the shaft 6 which may be measured is determined by the index of refraction of the prism 2 and specifically by the so-called critical angle of the prism (the angle of incidence of a beam of light on an interface at which no refracted ray exists). For a prism having an index of refraction of 1.5, the "critical angle" for a light beam in the prism striking a prism/air interface is about 40 degrees so that refraction will occur only through an angular displacement of the prism of about 80° (i.e., through rotation of the prism from an angle of incidence of about 40° on one side of the normal of the refractive interface to about 40° on the other side of the normal). Outside of this 80° range no refraction occurs and so, of course, no signal would be generated by photo detectors. It should also be noted that as such a prism is rotated through the 80° range, the refracted ray moves through an angular displacement of about 75°. This can be verified by applying Snell's Law to a prism of the type shown in FIGS. 1 and 2 and assuming that the index of refraction of the prism is 1.5.

Figure 3A:
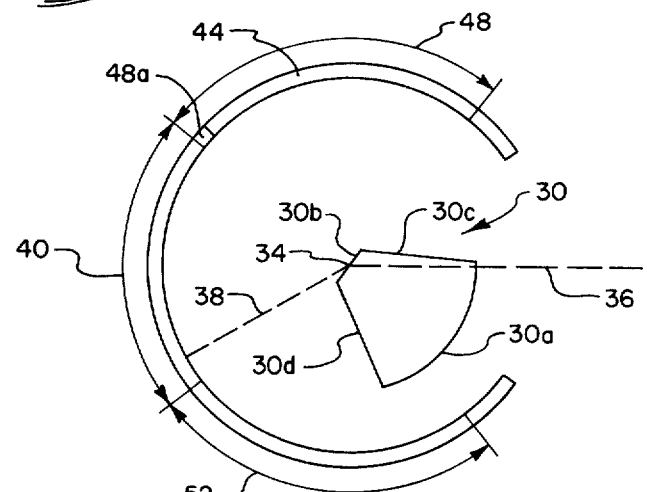
FIGS. 3A, 3B, and 3C are end views of an alternative embodiment of the invention which includes a prism having both refractive and reflective surfaces.
Figure 3B:
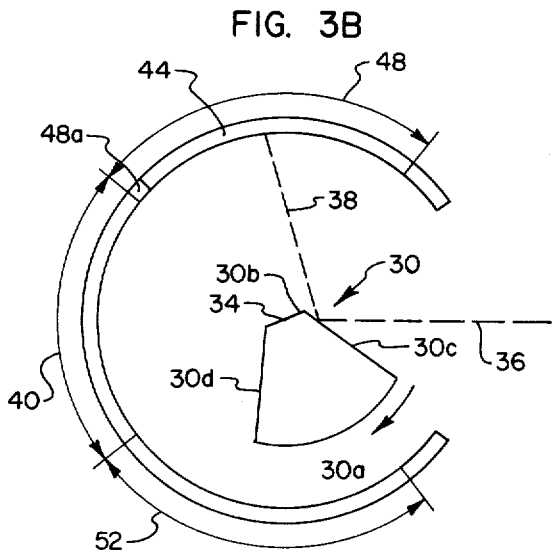
Figure 3C:
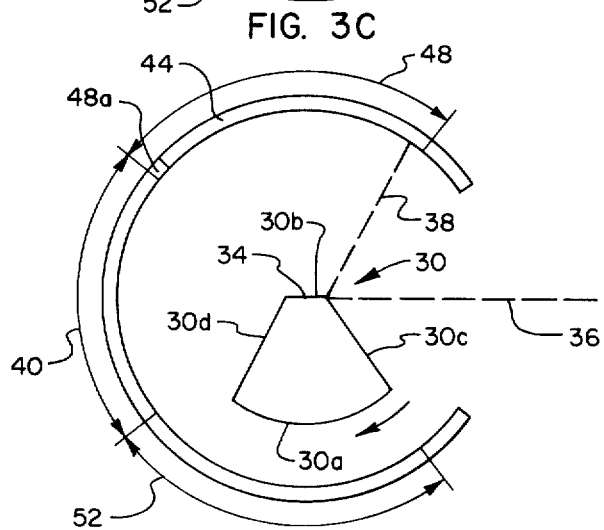

The prism configuration shown in FIGS. 3A through 3C enable determining the angular position of a shaft through a greater angular displacement that can be done with the FIGS. 1 and 2 configuration. In the FIGS. 3A through 3C prism configuration, a four-sided prism 30 is provided with one side 30a being curved about a center of curvature 34, an opposite side 30b being substantially flat, and the two other sides 30c and 30d also being substantially flat and having silvered (or other reflective material) surfaces to reflect light impinging thereon. The four sides of the prism 30 might illustratively be oriented relative to each other in such a manner as to privide for a continuous readout from the photo detector array 44 as the prism is rotated through some predetermined angular displacement. That is, as the prism 30 is rotated through some predetermined range, the incident light beam 36 is either refracted or reflected onto the photo detector array 44 to provide an indication of the angular position of the prism and thus of the shaft on which it is mounted. This can best be understood by describing an exemplary range of movement of the prism 30 as shown in FIGS. 3A through 3C.

Assume that the prism 30 is positioned so that the incident beam of light 36 enters the prism through the curved surface 30a. In such a case, the beam travels through the prism 30 and is refracted at the surface 30b of the prism to impinge on one of the photo detectors in a range of the photo detector array 44 indicated by the arrow 40. When the prism is positioned in this manner, the light beam is refracted as previously described for the configuration of FIGS. 1 and 2. Assume now that the prism 30 is rotated in a clockwise direction to a point where the incident beam of light 36 strikes the reflective surface 30c of the prism. When this occurs, the light beam, of course, is no longer refracted but rather is reflected from the surface 30c to strike the photo detector array 44 somewhere in the range indicated by arrow 48 (See FIGS. 3B and 3C).

To avoid an ambiguous readout, the reflective surface 30c must be oriented with respect to the curved surface 30a such that the light reflected from the surface 30c will impinge on photo detectors different from those on which the refracted beam inpinges. To provide a continuous readout as the prism is rotated as indicated in FIGS. 3A and 3B, the photo detectors on which the reflected beam are to impinge must be positioned so that just as the prism 30 is rotated to position where the light beam 36 begins to strike the reflective surface 30c, the resulting reflected light beam will strike a photo detector in range 48. With the configuration shown in FIGS. 3A through 3C, the photo detector in question would be the photo detector indicated at 48a. Then, as the prism 30 were rotated further in the clockwise direction, the reflected beam would impinge on successive ones of the photo detectors in the range 48. When the prism 30 is rotated to a position in which the surface 30c is out of the line of travel of the beam 36, then, of course, no reflection occurs from surface 30c. The position of the prism 30 just before this would occur is shown in FIG. 3C. As can there be seen, the incident beam of light 36 strikes the prism at the reflective surface 30c very near the intersection of the surfaces 30c and 30b. It can be visualized that if the prism 30 were rotated in the clockwise direction a few more degrees, the incident beam 36 would strike the surface 30b and not the reflective surface 30c.

If the prism 30 of FIGS. 3A through 3C were rotated in the counterclockwise direction beginning from the position shown in FIG. 3A, it can be visualized that eventually the incident beam of light 36 would fall upon the reflective surface 30d causing a reflected beam to impinge on one of the photo detectors in the range designated by the arrow 52. In the manner described, a readout would be provided through an angular displacement by the prism 30 of about 180°, i.e., through a range beginning at the position in which the incident beam of light 36 strikes the reflective surface 30c very near the intersection of that surface with the surface 30b and ending at the position in which the incident beam of light 36 strikes the surface 30d very near the intersection of that surface with the surface 30b.

It can be appreciated that various arrangements using refractive and reflective surfaces on a prism body could be provided for giving a readout specifying shaft position. For example, the prism of FIGS. 3A through 3C might be provided with a one-way reflective surface at surface 30b so that a light beam striking the surface from a direction within the prism is refracted, but a light beam striking the surface from a direction without the prism is reflected. In such a case, a readout through a 360 degree rotation of the prism could be achieved.

It is to be understood that still other embodiments could be devised by those skilled in the art without departing from the spirit and scope of the invention, and the appended claims are intended to cover such other embodiments.

What is claimed is:

1. Apparatus for indicating angular position of a rotatable device comprising
   a prism coupled to the device to rotate therewith,
   means disposed laterally of the axis of rotation of the device for directing a beam of light to said prism, said beam passing through the prism and being refracted thereby, and
   an array of photo detectors positioned about the prism so that the refracted beam of light will impinge on one of the photo detectors, the particular photo detector on which the refracted light impinges depending upon the angular position of the prism and thus of the device.

2. Apparatus as in claim 1 wherein said prism is formed substantially into a semi-cylinder, having a curved side and flat side, said prism being disposed to rotate about its semi-cylindrical axis so that the beam of light enters at the curved side and exits from the flat side thereof.

3. Apparatus as in claim 2 wherein said prism is arranged to rotate about a point on said flat side at which the beam of light exits from the prism.

4. Apparatus as in claim 1 wherein said prism is formed to provide a curved surface on one side thereof for receiving the beam of light as the prism is rotated through a first predetermined angle, a refractive surface on a side opposite the curved surface for refracting light received by the curved surface, and at least one reflective surface on a side of the prism contiguous with the curved surface for receiving the beam of light as the prism is rotated through a second predetermined angle, said surfaces being oriented relative to each other such that as the prism is rotated, the light beam will either be refracted onto said photo detector array.

5. Apparatus as in claim 4 wherein said surfaces are oriented relative to each other such that as the prism is rotated in one direction, refraction of the beam terminates just as reflection of the beam commences and, as the prism is rotated in the opposite direction, reflection of the beam terminates just as refraction of the beam commences.

6. Apparatus as in claim 5 wherein said surfaces are oriented relative to each other and to said photo detector array such that the refracted beam of light will impinge on one portion of the array and the reflected beam will impinge on a different portion of the array.

7. Apparatus as in claim 1 wherein said prism is formed into a body having four sides, a top and a bottom, one side providing a refractive surface, a side opposite said one side providing a curved surface, and the remaining two sides providing reflective surfaces, said prism being rotatable through a first predetermined angular displacement to refract onto the photo detector array from the refractive surface light entering the curved surface, said prism being rotatable through a second predetermined angular displacement to reflect the light beam from one of the reflective surfaces onto the photo detector array, and said prism being rotatable through a third predetermined angular displacement to reflect the light beam from the other reflective surface onto the photo detector array.

8. Apparatus as in claim 7 wherein the refractive and reflective surfaces of the prism are oriented relative to each other and to the photo detector array such that the refracted light and the reflected light from the two reflective surfaces each falls on different portions of the array.

9. Apparatus as in claim 8 wherein the refractive and reflective surfaces of the prism are oriented relative to each other and to the photo detector array such that the refracted light falls on a first portion of the array, the light reflected from one reflective surface falls on a second portion of the array contiguous with said first portion, and the light reflected from the other reflective surface falls on a third portion of the array contiguous with said first portion.

* * * * *